Patented Aug. 5, 1941

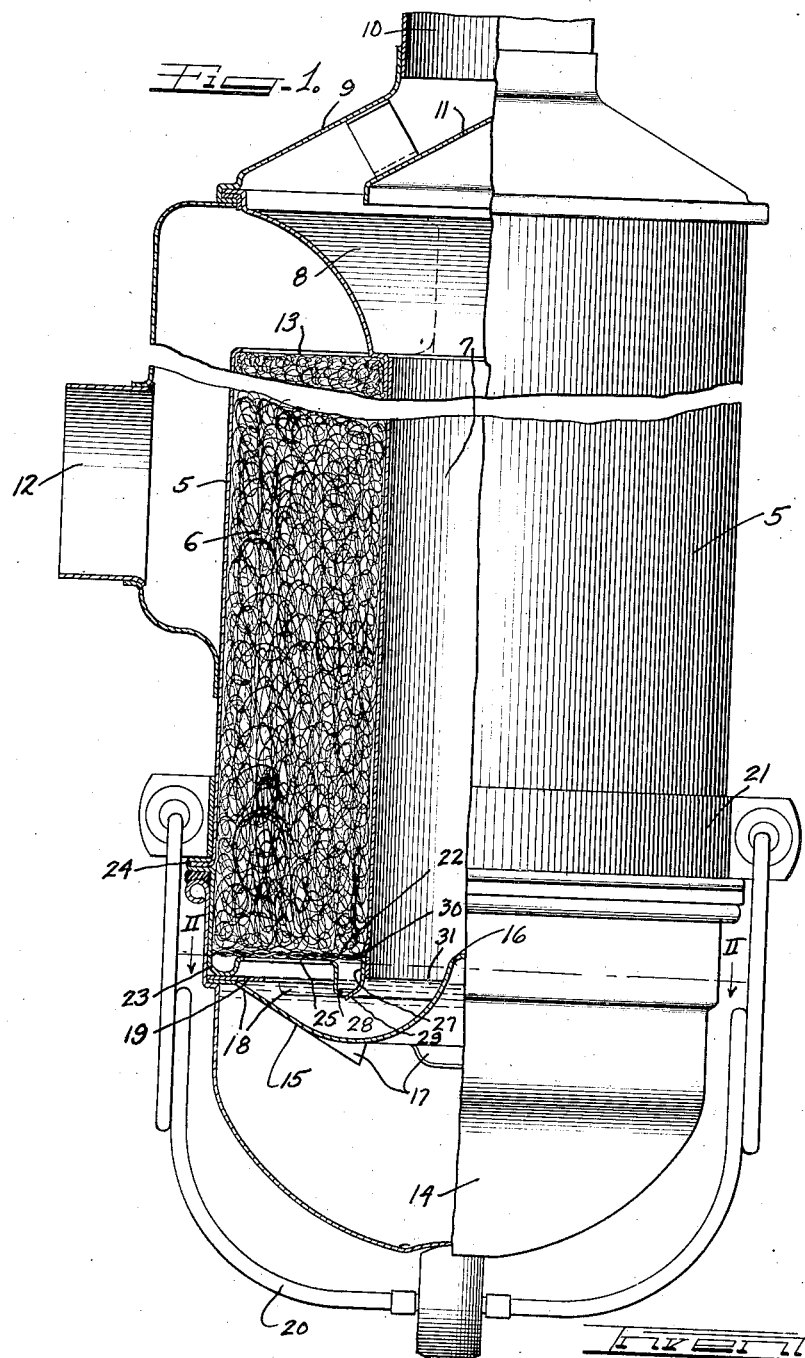

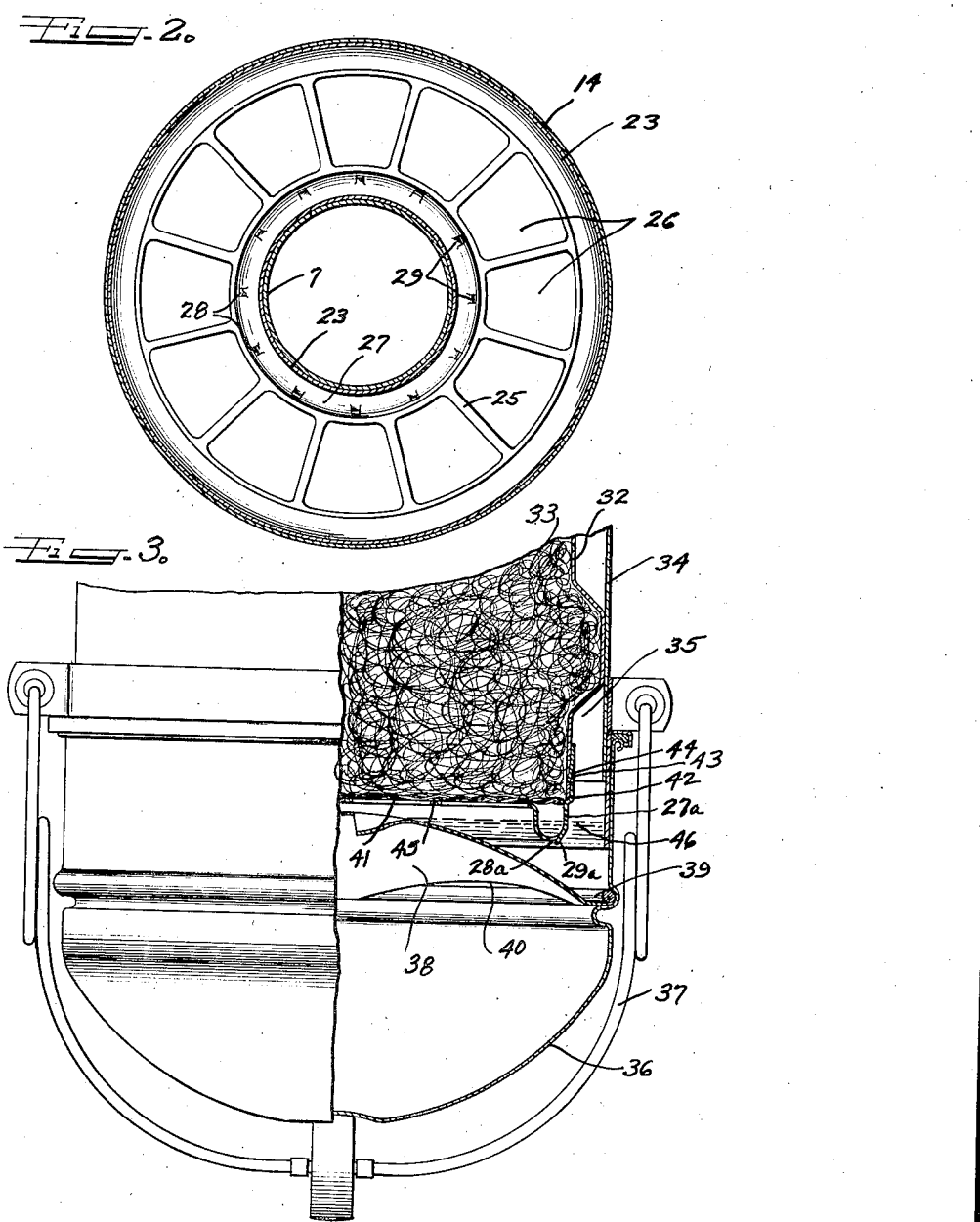

2,251,790

UNITED STATES PATENT OFFICE 2,251,790

AIR CLEANER

Theodore W. Hallerberg, Chicago, Ill., assignor to United Specialties Company, Detroit, Mich., a corporation of Delaware Application April 1, 1939, Serial No. 265,396

1 Claim. (Cl. 183—15)

This invention relates to improvements in an air cleaner, and more particularly to an air cleaner of the liquid bath type, highly desirable for use in connection with the carbureter inlet of an internal combustion engine and in connection with air compressors and other mechanisms or machines requiring a fairly constant supply of clean air and which machines create a suction for drawing the air through the cleaner, although the invention may have other uses and purposes as will be apparent to one skilled in the art.

When an air cleaner is used in connection with an internal combustion engine, it is essential that the air cleaner be of a certain required capacity for the particular engine, capable of a certain required efficiency, and capable of cleansing the air without any danger of pullover of the cleansing liquid into the carbureter of the engine. At the same time, the air cleaner must be manufactured in as small a size as possible because of the limited space beneath the hood of many types of automotive vehicles. Difficulty has heretofore been experienced in the manufacture of an air cleaner which will meet all of these requirements.

With the above in mind, it is an important object of the present invention to provide an air cleaner equipped with special construction and arranged to establish a definite circulation of cleansing liquid within the cleaner, and thus increase the capacity of the cleaner. Consequently, the cleaner may be built of a smaller size to perform a specific duty than was heretofore possible.

Another object of this invention is the provision of a liquid bath air cleaner having a special construction to insure adequate circulation of the washing medium, which structure may be incorporated in substantially any liquid bath air cleaner, regardless of the disposition of the inlet passage of the cleaner.

Another object of the invention is the provision of a liquid bath air cleaner containing a filter mass disposed above a liquid sump and constructed so that incoming air will carry sump liquid up into the filter mass, equipped with receiving means for draining liquid from the mass disposed immediately adjacent the inlet and arranged so that incoming air will aspirate or educe liquid from the receiving means directly into the air stream.

A further object of the present invention is the provision of a liquid bath air cleaner containing a filter mass, with associated construction arranged to cause air traveling through the cleaner to produce a region of low pressure immediately adjacent the inlet and thus cause a circulation of cleansing liquid through the filter mass in a direction leading away from the outlet of the cleaner, thereby increasing the capacity of the cleaner and lessening the chances of pullover of cleansing liquid through the outlet of the cleaner.

Another feature of the present invention is the provision of a liquid bath air cleaner having a filter mass, in which a filter holding element is incorporated, which element is arranged to insure a proper washing of incoming air, a proper circulation of air through the filter mass, and tend to lessen the chances of pull-over of cleansing liquid through the outlet of the cleaner.

Another feature of the invention resides in the provision of a novel structural arrangement for association with the filter mass of a liquid bath air cleaner, providing a drain trough adjacent the inlet passage of the cleaner, with openings in the bottom of the drain trough through which accumulated liquid may be aspirated by incoming air, thereby causing a region of low pressure adjacent the inlet and establishing a definite circulation of cleansing liquid in the filter mass.

Still a further object of the invention resides in the provision of means for providing a drain trough adjacent the inlet and beneath the filter mass of a liquid bath air cleaner, which drain trough is provided with apertures through which accumulated liquid may be aspirated or educed by incoming air, with guiding means associated with the apertures to direct the aspirated liquid directly into the path of the air stream.

A further very important object of the invention is the provision of a liquid bath air cleaner in which cleansing liquid is caused, by the action of the traveling air, to enter directly into the air stream from a plurality of different directions, and in which a definite circulation of cleansing liquid through the filter mass is established, which circulation is in a direction leading away from the outlet of the cleaner.

While some of the more salient features, characteristics and advantages of the present invention have been above pointed out, others will become apparent from the following disclosures, taken in conjunction with the accompanying drawings, in which:

Figure 1 is a fragmentary, part elevational, part vertical sectional view of an air cleaner embodying principles of the present invention;

Figure 2 is a plan sectional view, with parts omitted, taken substantially as indicated by the line II—II of Figure 1, looking in the direction indicated by the arrows; and Figure 3 is a fragmentary, part sectional, part elevational view of an air cleaner of different construction also embodying principles of the present invention.

As shown on the drawings:

As mentioned above, the improvements of the present invention may be incorporated in air cleaners of various types, substantially regardless of the location of the inlet passage to the particular air cleaner. To illustrate this fact, by way of example and not by way of limitation, I have shown in Figures 1 and 2 the association of the present invention with a liquid bath air cleaner having a center tube inlet. In Figure 3, I have illustrated the association of the present invention with an air cleaner having an annular inlet adjacent the outer wall of the casing structure. In either instance, the improved features of the present invention function in the same way to produce the same results, it being only necessary to locate the drainage receiving means immediately adjacent the inlet to the cleaner, whether that inlet is in an outside or inside position.

With reference to Figures 1 and 2, it will be seen that the first illustrated embodiment of the invention is incorporated in an air cleaner embodying an upper casing section 5 containing a filter mass 6 surrounding a centrally disposed downwardly leading inlet conduit 7. The filter mass 6 may be of any suitable material, such as curled cattle tail hair, crimped or waved copper wire or ribbon, or the equivalent. A belled entrance 8 is provided to the inlet conduit 7, and above the entrance is a covering portion 9 which connects with an inlet conduit 10. A distributing member 11 which functions as a liquid trap in the event of backfire through the cleaner or other action resulting in a reverse travel of sump liquid may be used if so desired. On one side, a suitable outlet arrangement is provided, including an outlet conduit 12 for cleaned air which communicates with an opening 13 above the filter mass.

The lower casing section is in the nature of a cup 14 to define the liquid sump beneath the filter mass. This casing section carries a baffle 15 having a peaked central part 16, a series of openings 17 through which sump liquid may be aspirated by air traveling over the upper surface of the baffle, and a plurality of higher openings 18 adjacent which is a scoop flange 19 to remove the heavier dirt-laden sump liquid and permit it to return to the bottom of the sump after passing over the area of the baffle between the openings 17 and 18.

The cup 14 is removably held in position by means of a suitable bail 20 connected with a split ring holder 21 or the equivalent.

Disposed beneath the filter mass 6 is a relatively wide mesh screen or layer of hardware cloth 22. This layer of hardware cloth or the like, together with the filter mass, is held in position by a filter holder 23 attached to the casing 5 by an interlocked seam, as indicated at 24, the filter holder forming in effect a continuation of the casing wall 5 below the interlocked seam. The holder is then turned inwardly and a raised portion 25 in the form of a series of widely spaced bars abuts the screen or hardware cloth 22. With reference to Figure 2, it will be seen that the bars 25 define an annulus of relatively large openings 26 through which incoming air may pass into the filter mass. Immediately adjacent the inlet conduit 7, the filter holder is shaped to provide a downwardly extending groove 27 which functions as a drainage trough for cleansing liquid draining out of the filter mass. In the bottom of this trough or channel, a series of openings 28 are provided, through which incoming air may aspirate liquid accumulated in the trough. Each of these openings is preferably made by striking out a tongue 29 from the metallic stock of the filter holding element. As seen more clearly in Figure 1, the tongues are left in an inclined position, with the inclination in the direction of the traveling air, so that incoming air must pass over the sloping walls of the tongue. Above the trough, the inner edge of the filter holding element abuts one or more preferably narrow tongues 30 struck from the side of the inlet conduit 7, which tongues aid in properly positioning the holding element during assembly of the cleaner.

In operation, the cleaner is connected through the outlet conduit 12 to a mechanism capable of sucking in air, such as the air intake to a carbureter of an internal combustion engine. Due to suction developed in the engine, air is drawn through the cleaner. The air forcibly descends to the inlet conduit 7, strikes the baffle 15, and is turned laterally and upwardly by the upper face of the baffle, rising through the filter mass 6 and exiting through the outlet 12.

At the start of the operation, the cup 14 carries a cleansing liquid, such, for example, as crankcase oil, to a static level substantially as indicated by the dotted line 31. It will be noted that this level seals off the bottom end of the inlet conduit 7. Immediately upon the start of operation, all of the liquid disposed above the upper face of the baffle is at once pushed upwardly into the filter mass. As operation continues, more liquid is aspirated through the opening 17 in the baffle directly into the air stream. Some of this liquid will be carried up into the filter mass, and a portion of it, the more heavily dirt-laden, will be scooped out of the air stream by the scoop 19 and returned through the openings 18 to the sump.

At the same time, another circulation will be established by the traveling air through the filter mass itself. The liquid in the filter mass will tend to gravitate into the trough 27 and the aspirating or educing action of the traveling air will draw liquid from this trough through the openings 28 directly into the air stream, the tongues 29 aiding in properly guiding the liquid into the air stream. The aspirating action of the incoming air will create a region of low pressure in the filter mass adjacent the inlet conduit 7, so that the liquid contained in the filter mass will tend to seek this region of low pressure and the circulation will be definitely maintained during operation. This circulation in short will be liquid carried upwardly through the large opening 26 into the filter mass, across inside the mass to the inlet conduit, and down adjacent the inlet conduit into the trough 27, from which it is again aspirated into the air stream and carried up into the filter mass. With sump liquid being aspirated forcibly into the air stream, both from above and also from the sump underneath through the openings 17, there is a thorough comminglement of liquid and air, insuring a positive cleansing action. The aspiration of the sump liquid from the filter mass prevents the liquid from rising too high within the mass, thus leaving plenty of the filtering mass to remove any entrained liquid from the air and insuring that the air leaves clean and liquid-free through the outlet. With this added washing action and with the definitely established circulation in the filter mass, with the general direction of the circulation away from the outlet, the capacity of the cleaner is increased, and therefore the size of the cleaner may be reduced to perform the specific job that has heretofore required a larger sized cleaner.

In Figure 3, I have illustrated a different form of air cleaner embodying principles of this invention. In this instance, the cleaner includes a casing section 32 containing a filter mass 33 surrounded by a shell 34 in concentric relation and spaced from the casing 32 to provide an annular inlet passage 35. A suitable cup member 36 defining the liquid sump is held in position upon the cleaner by a bail 37 or equivalent means.

Inside the cup, a baffle 38 is retained in position by a spring ring 39 or equivalent means. The baffle is generally dome-like in shape and is provided with a plurality of openings 40 through which sump liquid may be aspirated or educed by air traveling over the upper surface of the baffle. As seen in Figure 3, the baffle may have an apertured central depression through which liquid may return to the sump when draining from the filter mass, and the aperture aids in preventing the occurrence of a suction or dead-air pocket beneath the baffle.

The usual heavy screen or sheet of hardware cloth 41 is provided beneath the filter mass 33 and a filter holding element 42 is attached to the lower part of the casing section 32. The casing section is provided with a plurality of apertures 43, and the holding element 42 has a similar number of tongues 44 struck therefrom. When the holding element is pressed upwardly in telescopic association with the casing section 32, the tongues 44 snap into the holes 43 and lock the filter holding element in position. Beneath the filter the holding element is provided with a series of bars 45 defining large openings therebetween. Adjacent the outer portion thereof, immediately adjacent the inlet passage 35, the holding element is provided with a trough formation 27a having openings 28a in the bottom formed by striking out inclined tongues 29a, just as previously described in connection with Figures 1 and 2.

The operation of the cleaner construction shown in Figure 3, insofar as the trough formation on the filter holding element is concerned is substantially the same as that previously described. Incoming air traveling forcibly downwardly through the inlet 35 turns inwardly and upwardly over the face of the baffle, aspirating liquid through the openings 40 directly into the air stream from the sump therebeneath. The static liquid level is indicated at 46, preferably sufficiently high to seal off the inlet opening. Consequently, all of the sump liquid above the baffle is pushed immediately into the filter mass 33. Then the aspiration from the sump through the openings 40 begins. At the same time, a suction is created through the openings 28a, and the liquid within the filter mass tends to move towards the outside, drain into the trough, and is aspirated directly into the path of incoming air. With the cleaner shown in this figure, the outlet passage is preferably centrally located, so that the circulation within the filter mass has a general direction away from the outlet.

From the foregoing, it is apparent that I have provided an air cleaner embodying a novel construction, wherein a positive and definite circulation of cleansing fluid within the filter mass is set up, the general direction of the circulation being away from the outlet of the filter. Further, incoming air not only causes such circulation, but also establishes a secondary circulation from the liquid sump, so that sump liquid is aspirated or educed directly into the air stream from a plurality of different directions, insuring a thorough commingement of sump liquid with the air and thus enhancing the cleansing process. It will be seen that the cleaner structure is very efficient in action and highly economical to manufacture, when it is recalled that by my novel invention, the capacity of the cleaner is increased, permitting the entire cleaner to be made of a smaller size and perform the same duties as required a larger sized cleaner heretofore.

It will, of course, be understood that numerous details of construction may be varied through a wide range without departing from the principles of this invention, and it is therefore not the purpose to limit the patent granted hereon otherwise than is necessitated by the scope of the appended claim.

I claim as my invention:

In an air cleaner, a casing having a liquid sump, a center tube inlet extending into said casing, a filter mass around said tube above said sump, said casing having an outlet communicating with the region above said filter mass, and a trough-like annular member with curved side walls below said filter mass and extending around and below the inner end of said tube into the path of incoming air, said member having an annular series of openings in the bottom thereof through which sump liquid previously carried into the filter mass may be aspirated by traveling air into the air stream, and a sloping tongue adjacent each opening of said series extending therebelow with its inclination in the direction of air travel through the cleaner.

THEODORE W. HALLERBERG.